(12) United States Patent
Zilles et al.

(10) Patent No.: US 7,680,250 B1
(45) Date of Patent: Mar. 16, 2010

(54) INTERACTIVE METHOD AND SYSTEM OF TESTING AN AUTOMATED CALL TELEPHONIC COMMUNICATION SYSTEM

(75) Inventors: Russell Zilles, Woodbury, MN (US); Bill Coleman, Saint Paul, MN (US); Shan Brickey, Lake Elmo, MN (US); Drew Koenig, Blaine, MN (US)

(73) Assignee: Interactive Quality Services, Minneapolis, MN (US)

( * ) Notice: Subject to any disclaimer, the term of this patent is extended or adjusted under 35 U.S.C. 154(b) by 1512 days.

(21) Appl. No.: 10/996,696

(22) Filed: Nov. 24, 2004

(51) Int. Cl.
*H04M 1/24* (2006.01)
*H04M 3/08* (2006.01)
*H04M 3/22* (2006.01)

(52) U.S. Cl. .................. 379/9; 379/10.03; 379/29.1

(58) Field of Classification Search ............ 379/9–9.04, 379/10.01, 10.03, 15.01, 26.01, 26.02, 29.01, 379/29.1, 32.01; 714/25, 26, 46, 57
See application file for complete search history.

(56) References Cited

U.S. PATENT DOCUMENTS

| | | | |
|---|---|---|---|
| 4,197,427 A | 4/1980 | Hutcheson et al. |
| 4,314,110 A | 2/1982 | Breidenstein et al. |
| 4,405,833 A | 9/1983 | Cave et al. |
| 4,510,351 A | 4/1985 | Costello et al. |
| 4,580,016 A | 4/1986 | Williamson |
| 4,625,081 A | 11/1986 | Lotito et al. |
| 4,629,836 A | 12/1986 | Walsworth |
| 4,727,566 A | 2/1988 | Dahlqvist |
| 4,771,425 A | 9/1988 | Baran et al. |
| 4,819,228 A | 4/1989 | Baran et al. |
| 4,847,885 A | 7/1989 | Vittorelli |
| 4,881,230 A | 11/1989 | Clark et al. |
| 4,903,261 A | 2/1990 | Baran et al. |
| 5,007,000 A | 4/1991 | Baldi |
| 5,065,422 A | 11/1991 | Ishikawa |
| 5,239,460 A | 8/1993 | LaRoche |
| 5,303,228 A | 4/1994 | Tzeng |
| 5,311,588 A | 5/1994 | Polcyn et al. |

(Continued)

FOREIGN PATENT DOCUMENTS

WO   WO 98/27711   6/1998

(Continued)

OTHER PUBLICATIONS

Emerson, S. Thomas, "Voice Response Systems—Technology to the Rescue for Business Users", Speech Technology, pp. 99-103 (Jan. Feb. 1, 1983).

(Continued)

*Primary Examiner*—Quoc D Tran
(74) *Attorney, Agent, or Firm*—Ulbrich I.P., Ltd.

(57) ABSTRACT

An interactive method and system of testing an automated call telephonic communication system. The method and system includes a testing system configured to test an automated call telephonic and/or telecommunication network. The testing system includes a testing subsystem that conducts the telecommunication test and sends the test results to a monitoring subsystem of the testing system to process the test results and display them to the end user. An end user is able to monitor the testing of the telecommunication system in real time with an Internet-enabled end user station that is in secure communication with the testing system.

18 Claims, 12 Drawing Sheets

U.S. PATENT DOCUMENTS

| | | |
|---|---|---|
| 5,359,646 A | 10/1994 | Johnson et al. |
| 5,365,574 A | 11/1994 | Hunt et al. |
| 5,369,680 A | 11/1994 | Borbas et al. |
| 5,371,787 A | 12/1994 | Hamilton |
| 5,384,822 A | 1/1995 | Brown et al. |
| 5,410,585 A | 4/1995 | Kawaharata |
| 5,428,679 A | 6/1995 | French |
| 5,461,662 A | 10/1995 | Hanai |
| 5,465,286 A | 11/1995 | Clare et al. |
| 5,473,666 A | 12/1995 | Szczebak, Jr. et al. |
| 5,485,569 A | 1/1996 | Goldman et al. |
| 5,524,139 A | 6/1996 | Jones |
| 5,535,256 A | 7/1996 | Maloney et al. |
| 5,553,121 A | 9/1996 | Martin et al. |
| 5,572,570 A | 11/1996 | Kuenzig |
| 5,577,112 A | 11/1996 | Cambray et al. |
| 5,579,368 A | 11/1996 | van Berkum |
| 5,600,718 A | 2/1997 | Dent et al. |
| 5,621,854 A | 4/1997 | Hollier |
| 5,633,909 A | 5/1997 | Fitch |
| 5,680,450 A | 10/1997 | Dent et al. |
| 5,710,803 A | 1/1998 | Kowal et al. |
| 5,737,518 A | 4/1998 | Grover et al. |
| 5,742,670 A | 4/1998 | Bennett |
| 5,742,929 A | 4/1998 | Källman et al. |
| 5,758,027 A | 5/1998 | Meyers et al. |
| 5,774,535 A | 6/1998 | Castro |
| 5,778,049 A | 7/1998 | Young et al. |
| 5,784,406 A | 7/1998 | DeJaco et al. |
| 5,784,452 A | 7/1998 | Carney |
| 5,790,798 A | 8/1998 | Beckett, II et al. |
| 5,797,123 A | 8/1998 | Chou et al. |
| 5,802,146 A | 9/1998 | Dulman |
| 5,809,108 A | 9/1998 | Thompson et al. |
| 5,822,397 A | 10/1998 | Newman |
| 5,825,855 A | 10/1998 | Astarabadi |
| 5,835,565 A | 11/1998 | Smith et al. |
| 5,848,384 A | 12/1998 | Hollier et al. |
| 5,850,627 A | 12/1998 | Gould et al. |
| 5,852,650 A | 12/1998 | Hyyrynen et al. |
| 5,854,823 A | 12/1998 | Badger et al. |
| 5,884,032 A | 3/1999 | Bateman et al. |
| 5,933,475 A | 8/1999 | Coleman |
| 5,940,472 A | 8/1999 | Newman et al. |
| 5,946,372 A | 8/1999 | Jones et al. |
| 5,961,620 A | 10/1999 | Trent et al. |
| 5,990,852 A | 11/1999 | Szamrej |
| 5,991,373 A | 11/1999 | Pattison et al. |
| 6,005,932 A | 12/1999 | Bloom |
| 6,014,424 A | 1/2000 | Thai |
| 6,018,567 A | 1/2000 | Dulman |
| 6,038,288 A | 3/2000 | Thomas et al. |
| 6,052,371 A | 4/2000 | Lemieux |
| 6,055,298 A | 4/2000 | Sugimoto |
| 6,091,802 A | 7/2000 | Smith et al. |
| 6,100,906 A | 8/2000 | Asaro et al. |
| 6,161,148 A | 12/2000 | Pratt et al. |
| 6,192,108 B1 | 2/2001 | Mumford et al. |
| 6,212,506 B1 | 4/2001 | Shah et al. |
| 6,269,150 B1 | 7/2001 | Herrbach et al. |
| 6,286,050 B1 | 9/2001 | Pullen et al. |
| 6,292,481 B1 | 9/2001 | Voit et al. |
| 6,298,267 B1 | 10/2001 | Rosborough et al. |
| 6,304,633 B1 | 10/2001 | Adachi et al. |
| 6,304,634 B1 | 10/2001 | Hollier et al. |
| 6,314,319 B1 | 11/2001 | Kroll et al. |
| 6,397,242 B1 | 5/2002 | Devine et al. |
| 6,405,149 B1 | 6/2002 | Tsai et al. |
| 6,425,096 B1 | 7/2002 | Liese et al. |
| 6,486,892 B1 | 11/2002 | Stern |
| 6,490,350 B2 | 12/2002 | McDuff et al. |
| 6,504,905 B1 | 1/2003 | Tsai et al. |
| 6,510,220 B1 | 1/2003 | Beckett, II et al. |
| 6,515,968 B1 | 2/2003 | Combar et al. |
| 6,516,051 B2 | 2/2003 | Sanders |
| 6,587,543 B1 | 7/2003 | Howard et al. |
| 6,611,498 B1 | 8/2003 | Baker et al. |
| 6,714,217 B2 | 3/2004 | Huang et al. |
| 6,724,865 B1 | 4/2004 | Michel et al. |
| 6,760,621 B2 | 7/2004 | Walcott et al. |
| 6,987,837 B1 * | 1/2006 | Blank et al. ............... 379/1.01 |
| 7,400,586 B2 * | 7/2008 | Izundu et al. ............. 370/241 |
| 2002/0176543 A1 | 11/2002 | Creamer et al. |
| 2003/0231741 A1 * | 12/2003 | Rancu et al. ................ 379/9 |
| 2004/0008825 A1 * | 1/2004 | Seeley et al. ............ 379/32.01 |
| 2005/0047556 A1 * | 3/2005 | Somerville et al. ........ 379/9.01 |

FOREIGN PATENT DOCUMENTS

WO      WO 99/03534      1/1999

OTHER PUBLICATIONS

Hester, et al., The AT&T Multi-Mode Voice Systems—Full Spectrum Solutions for Speech Processing Applicators, Proceedings of the 1985 A VOIS Conference, pp. 1, 3, 5, 7 and 9 (Sep. 1985).

Moosemiller, John P., "AT&T's Conversant I Voice System,", Speech Technology, pp. 88, 90 and 92 (Mar.Apr. 1, 1986).

Perdue, Robert J. and Eugene L. Rissanon, "Conversant 1 Voice System Architecture and Applications" AT&T Technical Journal, pp. 34-47 (Sep.Oct. 1, 1986).

* cited by examiner

Call Result Information For IQS_ORCA_RealTimeDemo
Thursday, March 18, 2004

Display last 96 records in 58 Seconds | Print Call Results Table

Call Results - Click here to explain

| Record ID | Recording | TestCase | Call Result | IQS Dial Time | Call Answer Time | Call Done Time | Call Duration | Answer Response (Sec.) |
|---|---|---|---|---|---|---|---|---|
| 96 | O | ORCA | Busy | 4:20:31 PM | 4:20:30 PM | 4:20:38 PM | 7.14 | 1.298 |
| 95 | O | ORCA | Busy | 4:20:18 PM | 4:20:17 PM | 4:20:25 PM | 7.17 | 1.329 |
| 94 | O | ORCA | Busy | 4:20:12 PM | 4:20:06 PM | 4:20:35 PM | 23.203 | 13.549 |
| 93 | O | ORCA | Busy | 4:20:04 PM | 4:20:03 PM | 4:20:11 PM | 7.14 | 1.309 |
| 92 | O | ORCA | Busy | 4:19:49 PM | 4:19:48 PM | 4:19:56 PM | 7.131 | 1.289 |
| 91 | O | ORCA | Answered Call | 4:19:36 PM | 4:19:46 PM | 4:20:40 PM | 64.643 | 6.469 |
| 90 | O | ORCA | Busy | 4:19:36 PM | 4:19:35 PM | 4:19:43 PM | 7.12 | 1.278 |
| 89 | O | ORCA | Busy | 4:19:35 PM | 4:19:29 PM | 4:19:59 PM | 24.185 | 14.531 |
| 88 | O | ORCA | Busy | 4:19:24 PM | 4:19:23 PM | 4:19:31 PM | 7.131 | 1.289 |
| 87 | O | ORCA | Busy | 4:19:09 PM | 4:19:08 PM | 4:19:16 PM | 7.15 | 1.308 |
| 86 | O | ORCA | Busy | 4:19:00 PM | 4:18:54 PM | 4:19:23 PM | 23.183 | 13.54 |
| 85 | O | BANKING | Answered Call | 4:18:57 PM | 4:19:11 PM | 4:19:47 PM | 50.082 | 6.645 |
| 84 | O | ORCA | Busy | 4:18:56 PM | 4:18:55 PM | 4:19:03 | 7.14 | 1.289 |
| 83 | O | BANKING | Answered Call | 4:18:46 PM | 4:18:59 PM | 4:19:48 PM | 62.31 | 6.064 |
| 82 | O | ORCA | Busy | 4:18:41 PM | 4:18:40 PM | 4:18:48 PM | 7.141 | 1.308 |
| 81 | O | ORCA | Busy | 4:18:26 PM | 4:18:25 PM | 4:18:33 PM | 7.11 | 1.269 |
| 80 | O | ORCA | Busy | 4:18:24 PM | 4:18:18 PM | 4:18:47 PM | 23.114 | 13.46 |
| 79 | O | ORCA | Answered Call | 4:18:22 PM | 4:18:33 PM | 4:19:27 PM | 65.544 | 5.141 |
| 78 | O | ORCA | Busy | 4:18:11 PM | 4:18:10 PM | 4:18:18 PM | 7.151 | 1.299 |
| 77 | O | ORCA | Busy | 4:17:59 PM | 4:17:58 PM | 4:18:06 PM | 7.12 | 1.289 |
| 76 | O | BANKING | Answered Call | 4:17:54 PM | 4:18:08 PM | 4:18:45 PM | 51.043 | 6.605 |
| 75 | O | ORCA | Busy | 4:17:54 PM | 4:18:08 PM | 4:18:45 PM | 23.194 | 13.53 |

FIG. 8

Test Summary For IQS_ORCA_RealTimeDemo
Thursday, March 18, 2004

REAL TIME SUMMARY INFORMATION - Click here to explain

| Test Start Time | Test Stop Time | Test Duration (Minutes) | Current Calling Lines | Minutes@Current Calling Lines | Current Calls Connected | Total Calls Initiated | Total Calls Completed |
|---|---|---|---|---|---|---|---|
| 4:09:47 PM | 4:21:14 PM | 11 | 5 | 0 | 4 | 104 | 100 |

CALLS PER HOUR INFORMATION - Click here to explain

| Dialed Number | Average | Peak | Last 5 Minutes | Since Last Line Marker [12 Lines] |
|---|---|---|---|---|
| 2437176 | 255 | 0 | 0 | 0 |
| 2437179 | 95 | 0 | 0 | 0 |
| 2437193 | 45 | 60 | 36 | 45 |
| 2437194 | 60 | 12 | 48 | 55 |
| 243719 | 45 | 60 | 48 | 45 |
| OVERALL | 145 | 240 | 132 | 145 |

DIALED NUMBER INFORMATION - Click here to explain

| Dialed Number | Completed Calls | Connected Calls | Shortest (sec) | Longest (sec) | Average (sec) |
|---|---|---|---|---|---|
| 2437176 | 51(51.00%) | 51 (51.00%) | 7.000 | 7.000 | 7.000 |
| 2437179 | 19 (19.00%) | 19 (19.00%) | 23.000 | 24.000 | 24.000 |
| 2437193 | 9 (9.00%) | 9 (9.00%) | 65.000 | 66.000 | 65.000 |
| 2437194 | 12 (12.00%) | 12 (12.00%) | 6.000 | 51.000 | 46.000 |
| 243195 | 9 (9.00%) | 9 (9.00%) | 58.000 | 63.000 | 62.000 |
|  | Total: 100 | Total: 100 | Min: 6.000 | Max: 66.000 | Avg: 25.000 |

TEST CASE INFORMATION - Click here to explain

| Dialed Number | Completed Calls | Connected Calls | Shortest (sec) | Longest (sec) | Average (sec) |
|---|---|---|---|---|---|
| BANKING | 21 (21.00%) | 21 (21.00%) | 6.000 | 63.000 | 53.000 |
| ORCA | 79 (79.00%) | 79 (79.00%) | 7.000 | 66.000 | 18.000 |
|  | Total: 100 | Total: 100 | Min: 6.000 | Max: 66.000 | Avg: 25.000 |

REAL TIME SUMMARY INFORMATION - Click here to explain

| Dialed Number | Total Calls | Answered Calls | Unexpected Greeting | Busy | Fast Busy | Network Intercept | Ring No Answer | Dead Air | Dropped (No Greeting) | Dropped (After Greeting) | Modem | Pending Evaluation |
|---|---|---|---|---|---|---|---|---|---|---|---|---|

FIG. 9

INTERACTIVE METHOD AND SYSTEM OF TESTING AN AUTOMATED CALL TELEPHONIC COMMUNICATION SYSTEM

COPYRIGHT NOTICE

Portions of the appended source code program files contain material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

COMPACT DISC

A compact disc containing codes and information describing a preferred embodiment of the present invention is submitted herewith and is hereby incorporated by reference. The compact disc contains the following files and/or programs:

| Title | Size in Bytes | Date of Creation |
| --- | --- | --- |
| AnswerCustom.txt | 24,044 | Oct. 29, 2004 |
| AnswerCustom.txt | 1,090 | Oct. 29, 2004 |
| AnswerCustomChart.txt | 1,350 | Oct. 29, 2004 |
| AnswerCustomChart.txt | 274 | Oct. 29, 2004 |
| ErrorHandler.txt | 6,757 | Oct. 29, 2004 |
| History.txt | 163 | Oct. 29, 2004 |
| modGlobals.txt | 4,997 | Oct. 29, 2004 |
| modInetGraph.txt | 36 | Oct. 29, 2004 |
| Module1.txt | 31 | Oct. 29, 2004 |
| MSSCCPRJ.txt | 202 | Oct. 29, 2004 |
| StoredProcedures.txt | 37,226 | Oct. 29, 2004 |
| TextFileHandling.txt | 8,599 | Oct. 29, 2004 |
| VoiceInetGraph.txt | 146,746 | Oct. 29, 2004 |
| ErrorHandler.txt | 6,749 | Oct. 29, 2004 |
| History.txt | 230 | Oct. 29, 2004 |
| modGlobals.txt | 4,733 | Oct. 29, 2004 |
| modInetGraph.txt | 36 | Oct. 29, 2004 |
| Module1.txt | 31 | Oct. 29, 2004 |
| MSSCCPRJ.txt | 197 | Oct. 29, 2004 |
| SummaryChart.txt | 22,674 | Oct. 29, 2004 |
| SummaryChart.txt | 1,090 | Oct. 29, 2004 |
| SummaryChart.txt | 1,297 | Oct. 29, 2004 |
| SummaryChart.txt | 233 | Oct. 29, 2004 |
| TextFileHandling.txt | 9,051 | Oct. 29, 2004 |
| VoiceInetGraph.txt | 109,459 | Oct. 29, 2004 |
| ErrorHandler.txt | 6,731 | Oct. 29, 2004 |
| Form1.txt | 4,389 | Oct. 29, 2004 |
| ModGlobals.txt | 2,336 | Oct. 29, 2004 |
| Module1.txt | 82,588 | Oct. 29, 2004 |
| MSSCCPRJ.txt | 200 | Oct. 29, 2004 |
| Project1.0.CodeAdvisorReport.txt | 16,660 | Oct. 29, 2004 |
| RealTimeSummary.txt | 1,172 | Oct. 29, 2004 |
| RealTimeSummary.txt | 153 | Oct. 29, 2004 |

BACKGROUND OF THE INVENTION

The present invention relates to diagnostic testing of telephonic communication systems by automatic test sequences. More particularly, the present invention relates to an interactive web-based method and system of real-time monitoring and data reporting of the automatic testing of an automated call telephonic communication system.

DESCRIPTION OF RELATED ART

A linchpin of success for any businesses is its ability to communicate effectively with its customers. Therefore, it is not surprising that businesses are implementing automated call telephonic communication systems to receive, regulate and process customers' calls. All telephonic communication systems and/or networks are, unfortunately, susceptible to malfunctions and failure. When an automated call telephonic communication system malfunctions or fails a customers' call may be dropped or misdirected resulting in a frustrated and dissatisfied customer. The dissatisfied customer is then likely to direct their frustration to a live agent or operator, which increases call handling time and costs for the business.

Testing systems have been developed to aid businesses in verifying the proper operation of their telephonic communication systems. The testing systems generally entail detecting the progress of one or more pseudo-calls through the telephonic communication system. Call transfer progress detection may include detecting a dial tone, busy tone, ring-back tone, SIT tri-tones, dual tone multi-frequency (DTMF or touch tone), periods of silence, answer detection and on-hook detection. Various telephonic communication testing systems for automated call telephone networks are discussed in U.S. Pat. Nos. 6,587,543, 6,724,865 and 6,504,905.

Two different types of testing systems are currently being used to test automated call telephonic communication networks. The first testing system is an onsite system that entails a business purchasing testing hardware, making onsite connections of the testing hardware to the telephonic communication system for that business, and then conducting the test and interpreting the results. For example, Teltone sells onsite testing equipment that is used on the business's premises. One advantage to owning an onsite testing system is that the results may be monitored in real-time. However, in order to monitor the testing in real-time, a user must be at the testing site. In addition, the business needs to allocate employee time for training, upgrades, and operation of the testing system which can be expensive and time consuming.

The second type of testing systems for telephonic communication system or networks includes hiring an outside vendor to supply the testing hardware, conduct the test, gather the test result data and convey the results to the business. This testing system has the advantage of avoiding the expense of purchasing the testing hardware and the expense associated with training an employee to conduct the test and interpret the results. Unfortunately, the business is not able to view the results of the test in real-time. Rather, the business is usually sent or mailed the results after the completion of the test.

Software has been developed that permit businesses to monitor the status of their operating telephonic communication networks. Concord Communications Inc., for example, provides businesses with software to enable them to monitor and manage the performance of call center applications. Concord's software provides an end user with the ability to monitor transaction response times, performance impact of call center changes and to diagnosis a particular problem in the system by drilling-down through generated reports. However, a particular shortcoming of Concord's software is that it only monitors the status of the telephonic communication system under normal usage by customers. It does not test the functionality of the automated call telephonic communication system separate from and/or prior to customer usage.

Tektronix provides the "NET-7" system to monitor and analyze network systems for mobile or fixed operators. The NET-7 system utilizes a plurality of monitoring probes that gather data from calls or transactions entering a telephonic or telecommunication system. The NET-7 system can also synchronize and correlate data from all of the monitoring probes to ensure continuity of data. The NET-7 system also utilizes a graphic user interface (GUI) to permit an operator to manipulate and display the data in real-time to an end user. Despite its advantages, the NET-7 system has the shortcoming of only being able to monitor the normal operating status of a telecommunication system and does not provide functionality to test the system separate from and/or prior to such normal usage.

Some businesses have determined that the effectiveness of a telecommunication system could be improved by listening to recordings of the incoming calls at various points in the telecommunication system. For example, Witness Systems developed a suite of status-monitoring software termed "eQuality" that is capable of recording and retrieving customer interactions with the telecommunication system. The eQuality software includes a GUI that permits an end user to click on and listen to all or a portion of a call. However, similar to Concord and Tektronix, the eQuality software only permits a business to monitor a telecommunication system under normal operating conditions and does not provide a business with a means of testing the telecommunication system prior separate from and/or prior to usage by its customers.

What is needed in the industry is a testing system that tests an automated call telephonic communication system separate from and/or prior to usage by its customers and which permits a business or end user to remotely monitor the testing in real-time. What is also needed in the industry is an automated call telephonic communication testing system that eliminates the need for a business to purchase testing hardware. What is additionally needed in the industry is a method and system of presenting telephonic communication test result data in real-time to an end user in a user-friendly manner that does not require the end user to drill-down or go through numerous charts and/or graphs to obtain relevant and/or desired test information.

SUMMARY OF THE INVENTION

The above-mentioned need in the industry is met by the present invention. An interactive system and method for testing an automated call telephonic communication systems is described which permits an end user to monitor in real-time the testing of their telephonic communication system.

In one embodiment of the invention, the telephonic testing system utilizes an interactive web-based system to enable an end user to remotely monitor in real-time or at least near real-time a testing of an automated call telephonic or telecommunication system or network. The interactive system and method may include a web-enabled end user station that is in secure communication with a testing system configured to test a telephonic and/or telecommunication network. A server may be provided to authenticate the communications between the web-enabled end user station and the testing system to ensure that only the end user is able to monitor the testing. Results from the testing system can be stored in a database that is in communication with the end user station. A charting application or program is in communication with the database and the end user station to generate and display graphical representations of the test data to the end user.

BRIEF DESCRIPTION OF THE DRAWINGS

FIG. 8 depicts a GUI according to one embodiment of the invention which illustrates test results of calls entering the telephonic communication system;

FIG. 9 depicts a GUI according to one embodiment of the invention which illustrates a summary of test results;

DETAILED DESCRIPTION OF THE PREFERRED EMBODIMENTS

While this invention is susceptible of embodiment in many different forms, there are shown in FIGS. 1-12 and will be described herein in detail, specific example embodiments thereof with the understanding that the present disclosure is to be considered as an exemplification of the principles of the invention and is not intended to limit the invention to the specific embodiments illustrated.

Figure 1:
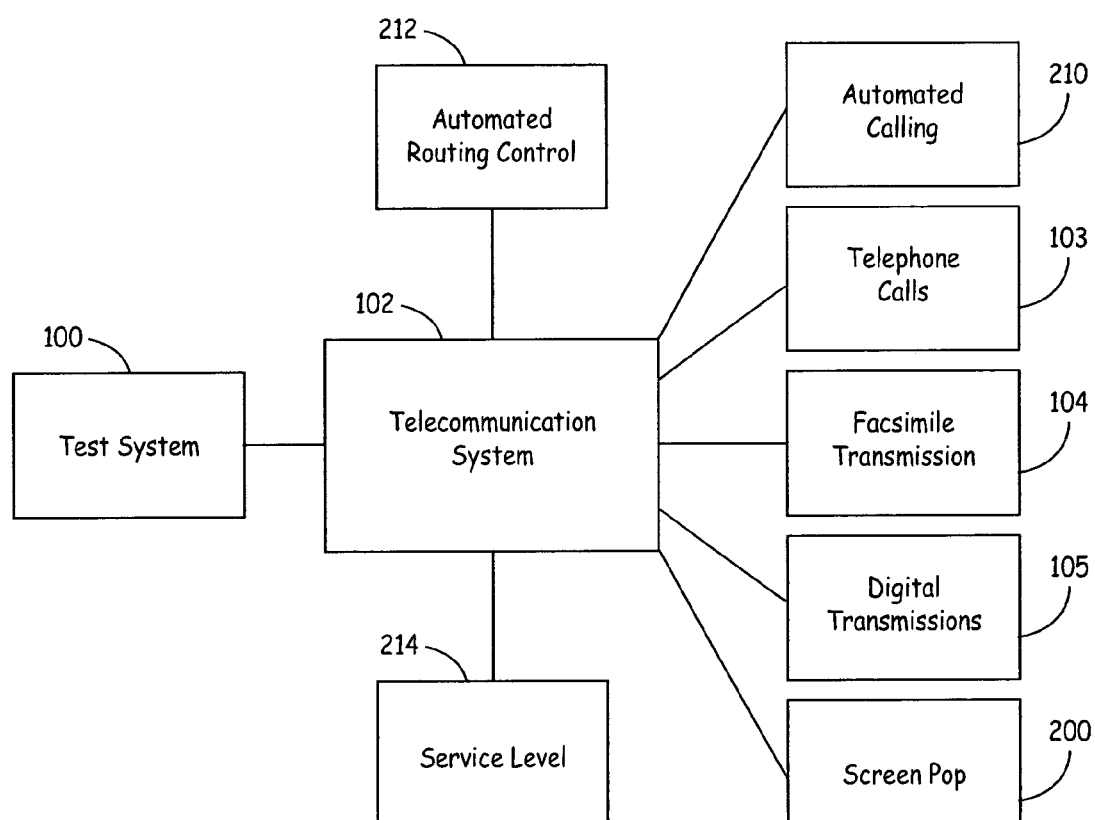
FIG. 1 is a block diagram of an embodiment of the invention including a test system in communication with a telecommunication system that is able to receive communications.

FIG. 1 is a block diagram of an example embodiment of the invention, including a test system 100 operably coupled to an automated call telephonic or telecommunication system 102. The automated call telecommunication system 102 controls incoming telephonic calls into and through the telecommunication system 102. As illustrated in FIG. 1, the telecommunication system 102 can accept telephone calls 103, facsimile transmissions 104, digital transmissions 105 and other like telecommunication transmissions.

Figure 2:
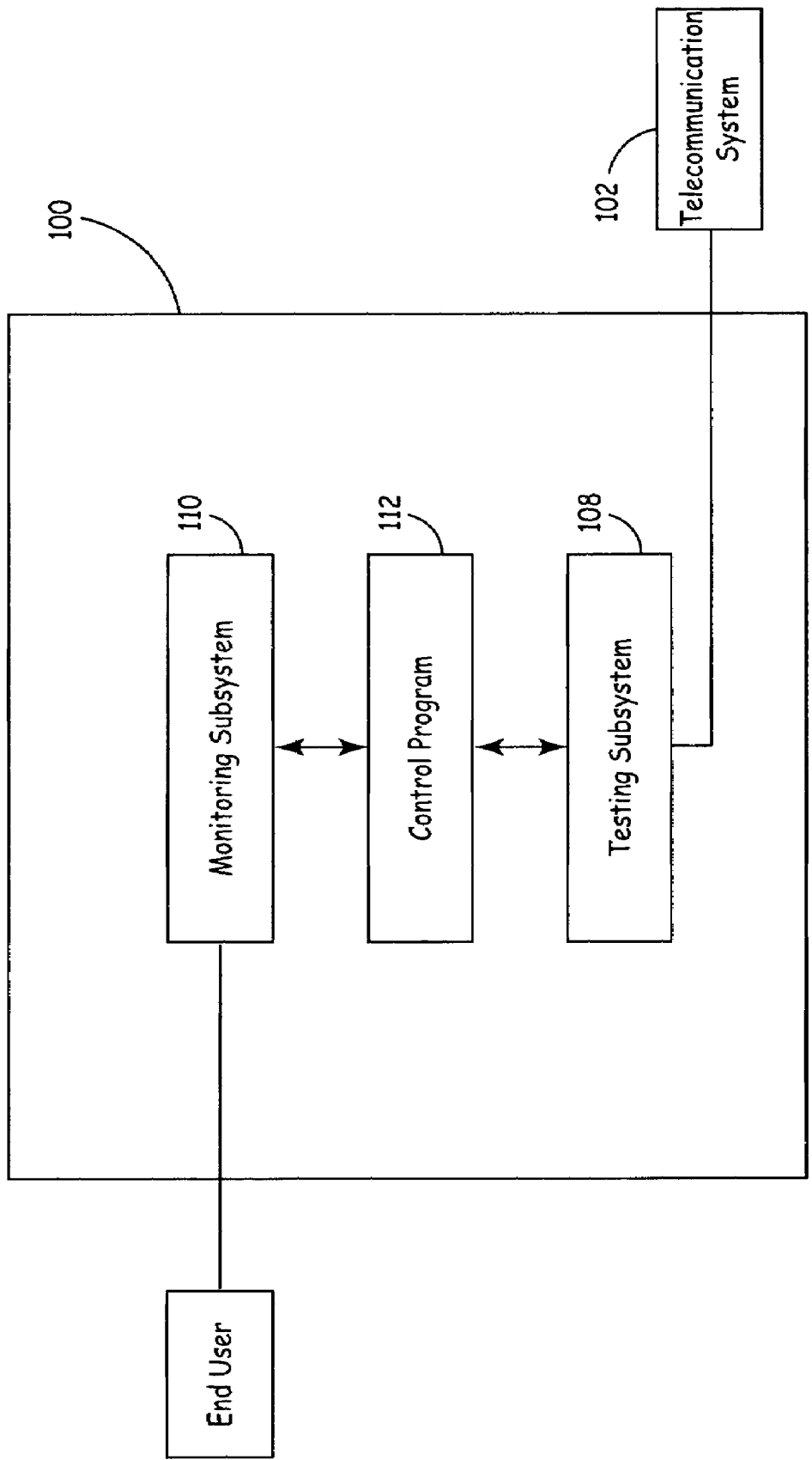
FIG. 2 is a block diagram of an embodiment of the testing system including a monitoring subsystem, a control program and a testing subsystem in communication with a end user station and a telecommunication system.

Referring to FIG. 2, the test system 100 generally includes a testing subsystem 108 to conduct tests of the telecommunication system 102. The testing system 100 also includes a monitoring subsystem 110, utilized by an end user, to monitor in near real-time the testing of the telecommunication system 102. An analyst is able to control the testing subsystem 108 and the monitoring subsystem 110 through a control program 112. The control program 112 permits an analyst to tailor testing subsystem 108 to test particular parameters, features and/or components of the telecommunication system 102. Additionally, the control program 112 permits an analyst to tailor the information displayed to an end user observing the testing of the telecommunication system 102.

Figure 3:
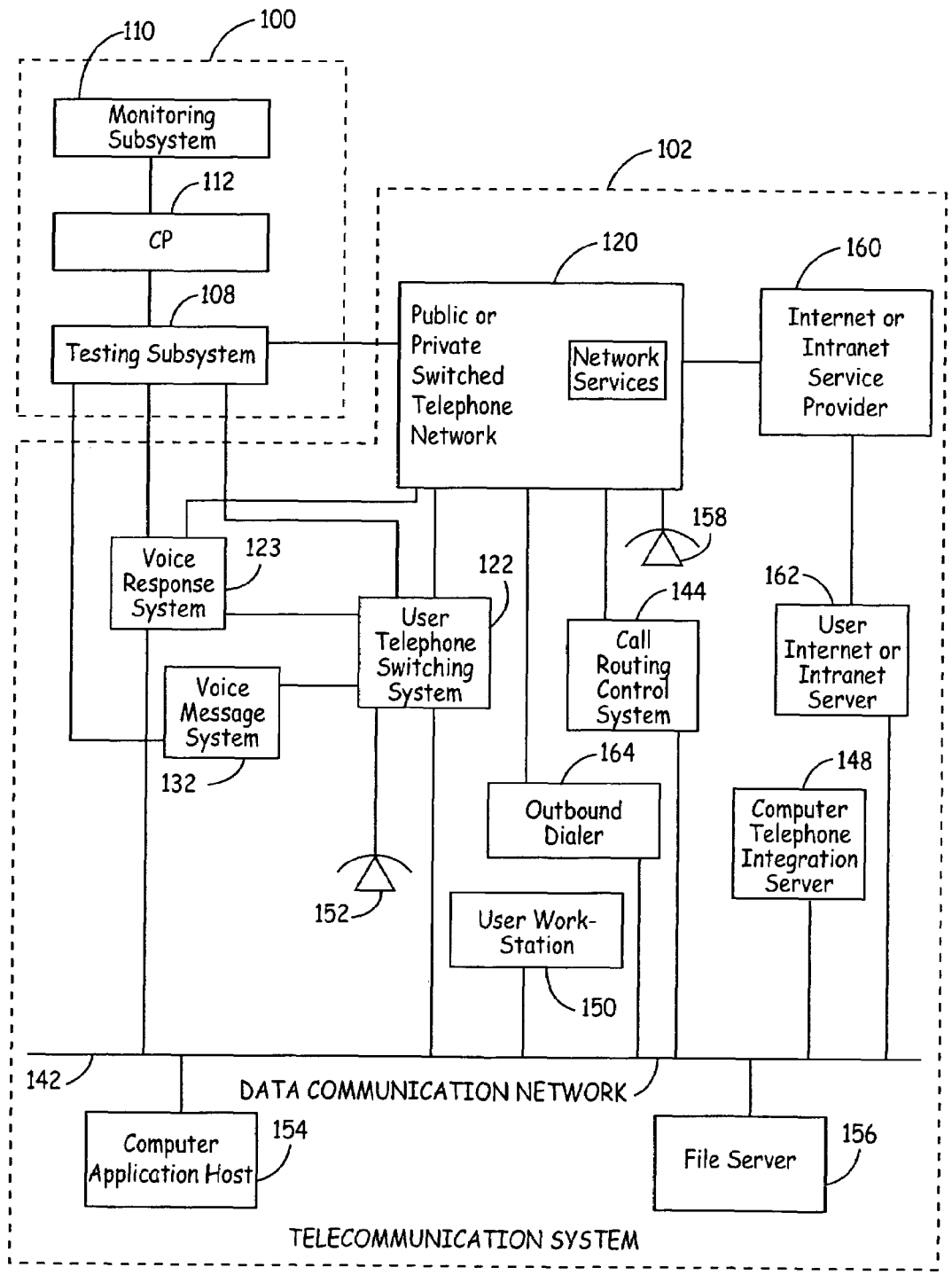
FIG. 3 is a block diagram of an embodiment of the testing system in communication with components of the telecommunication system.

The need to tailor the testing subsystem 104 increases the compatibility of the present invention with telecommunication systems 102 that vary widely throughout the industry. One telecommunication system 102 generally handles numerous call-related functions. An example embodiment of a telecommunication system 102 and potential subsystems or components is illustrated in FIG. 3. This particular telecommunication system 102 controls the switching between telephone calls, originating telephone calls, receiving telephone calls, controlling telephone calls and/or handling data and information relating to telephone calls. The subsystems of the telecommunication system 102 control the path of the telephone calls through the telecommunication system 102. The subsystems of the automated call telecommunication system 102 can include a public and/or private switched telephone network 120, a telephone switching system 122, voice response system 123, voice message system 132, data communication network 142, call routing system 144, user workstation 150, computer application host 154, file server 156, computer telephone integration server 148, internet and/or intranet service provider 162, user internet or intranet server 162 and/or outbound dialer 164. The telecommunication system 102 illustrated in FIG. 3 should be considered as an example of a testable automated call telecommunication system that is the subject of the present invention and should not be limited to its particular components and/or configurations.

The customization of the testing subsystem 108 permits an analyst to conduct tests on various features of the telecommunication system 102. For example, the testing subsystem 108 can conduct "audio time analysis" on the telecommunication system 102. Audio time analysis generally entails analyzing the timing of the speech audio signals produced by the telecommunication system 102 in response to a stimulus or audio input from the testing subsystem 108. The testing subsystem 108 is able to analyze the functionality of the telecommunication system 102, not by recognizing the speech content of the message, but by determining how long it takes to play all or portions of a message recorded by the telecommunication system 102. Additionally, the testing subsystem 108 is also able to measure brief periods of silence between speech audio signals. The testing subsystem 108 is then able to compare the duration of the speech audio signals and periods of silence with predetermined and/or calculated speech audio signal durations. By comparing the speech audio signals it is possible to determine which of several responses actually occurs at certain points during a test.

As illustrated in FIG. 1, another parameter of the telecommunication system 102 that may be analyzed by testing subsystem 108 is "Screen Pop 200." Screen Pop 200 is used by the telecommunication system 102 to allow an operator to quickly view and/or access a caller's information once the operator takes or receives the call. To test this parameter, the testing subsystem 108 can send one more calls to the telecommunication system 102 to be routed to an operator. The testing subsystem 108 then plays a recording or message to the operator to dial one or more dual tone multiple frequency (DTMF) digits on the telephone to confirm or reject that the call was answered, and/or the proper information was displayed on their screen or monitor. Other prompts may be played by the testing subsystem 108 depending upon the parameter that is being tested. Another parameter that may be analyzed is the transfer of caller data from one operator to another as a call is passed through the telecommunication system 102. The testing subsystem 108 can use the above-described prompts to determine if each operator receives the correct caller information on their screen.

The testing subsystem 108 is also able to test automated calling or dialing systems 210. The testing subsystem 108 receives test calls from a calling system such as the outbound dialer 164 of FIG. 3. The testing subsystem 108 tests the functionality of the outbound dialer 164 by responding to the incoming test calls by not answering the call, answering the calls after a predetermined amount of time, answering a call after a variable and/or random amount of time, causing a busy signal or other call progress tone. The testing subsystem 108 then records the outbound dialer's 164 response.

As is also illustrated in FIG. 1, the testing subsystem 108 can test an automated routing control 212 arrangement of the telecommunication system 102. In one embodiment of the invention, the testing subsystem 108 sends one or more test calls to the user telephone switching system 122. The testing subsystem 108 monitors, tracks and records the telephone switching system's 112 routing decision logic and process.

In another embodiment of the invention, the testing subsystem 108 can test the availability or service level 214 of a telecommunication system 102 during normal operation. To test telecommunication system availability the testing subsystem 108 can launch one or more test calls or data communication to the telecommunication system 102 that is operating under normal conditions. The testing subsystem 108 can then record the duration of audio speech and/or periods of silence for comparison to known durations.

The embodiments of the testing subsystem 108 and the telecommunication system 102 are described in more detail in U.S. Pat. No. 5,933,475 ('475 patent) and incorporated herein by reference. Additional embodiments of the telecommunication system 102 and methods of testing various subsystems and/or components are also described in more detail in the '475 Patent. The testing subsystem 108 and the telecommunication system 102 described herein and in the '475 patent should not be considered limiting as one skilled in the art will recognize that various embodiments are within the scope and spirit of the invention.

Figure 4:
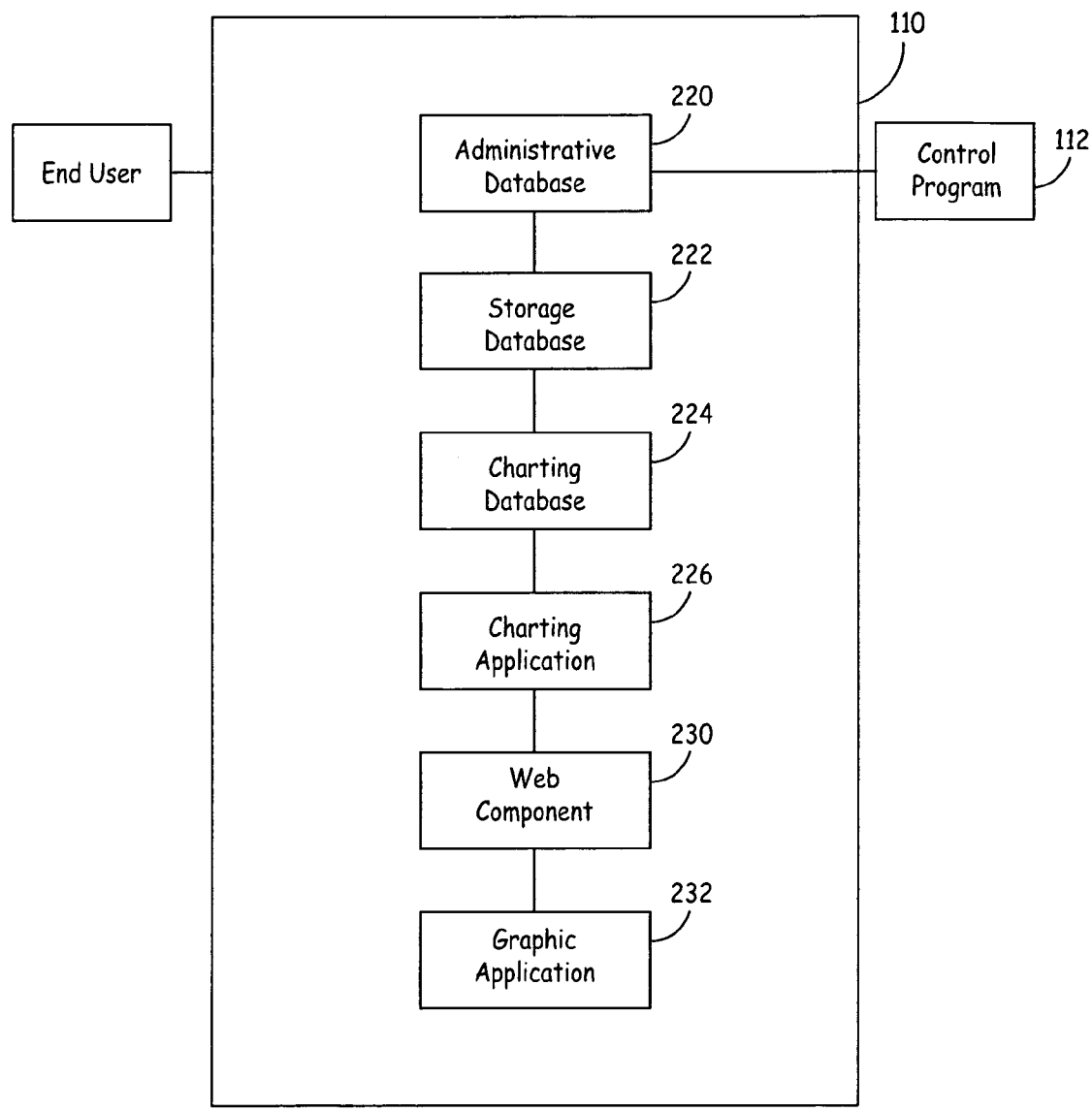
FIG. 4 is a block diagram of an embodiment of the monitoring subsystem including databases and applications.

Referring to FIG. 4, the monitoring subsystem 110 preferably includes an administrative database 220 stored on a server to facilitate the secure communication between an end user station and the monitoring subsystem 110. The monitoring subsystem 110 also preferably includes a storage database 222 stored on a server to temporarily store the test results that are received from the testing subsystem 108. The test results may be stored as tables labeled according to the particular test results or information that they contain. For example, the tables may include Answer Information, Calls Per Hour, Chart Table, Configuration Drill and System, Current Calls, Current Call Level, Dialed Number Summary Information, Dialed Number Summary Information Total, Master Log, Real Time Summary, Test Case Summary, Test Case Table and/or Voice Dialog. Other tables may also be utilized depending upon the particular parameter of the telecommunication system 102 that is being tested.

The monitoring subsystem 110 also preferably includes a charting database 224 in communication with the storage database 222. The charting database 210 is in communication with at least one charting program or application 226 that converts the test results into text files or any other file format known to one skilled in the art that can be adapted to generate graphs, charts and like display formats. In this embodiment, the text files can include data, mouse-over, hyperlinks and/or any other browser-based display functions and features. The charting application 226 may reside in the testing system 100 or it may reside on the end user's computer. The text files are generally smaller in size than files containing graphs and charts, therefore, by having the charting program 220 reside on the end user's computer it may be possible to speed up the transmission of the information.

In one embodiment of the invention, the text files are transmitted to a web component 230 of the monitoring subsystem 110. The web component 230 may reside on a server and may include a graphics generation application 232 that convert the text files into charts, graphs, and other similar graphics at step 254. The converted graphics may be stored in the storage database 222 and/or charting database 224. The graphic generation application 232 preferably comprises a Visual Basic application or any other like application that is capable of generating graphs and charts.

Figure 5:
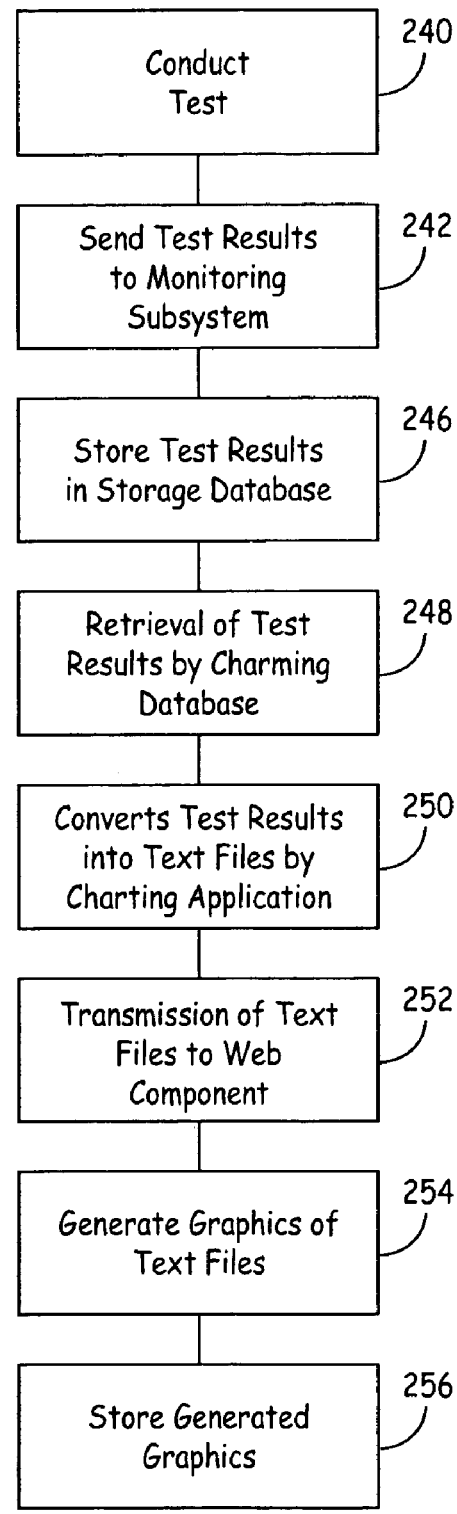
FIG. 5 is a flow chart illustrating an embodiment of a method of testing a telecommunication system and generating graphical representations of the test results.

In use, the testing subsystem 108 conducts a test of the telecommunication system 102 at step 240 of FIG. 5. The test results are then transmitted to the monitoring subsystem 110 at step 242. In one embodiment, as illustrated at step 246 of FIG. 5, the test results are transmitted to the storage database 222. The test results may then be retrieved by the charting database 224 and converted into the text files by the charting application 226. In another embodiment, the test results are transmitted directly to the charting database 224 and/or charting application 226 for conversion into the text files. The text files are then transmitted to the web-component 230 at step 252 where they are converted from the text files into graphs and charts at step 254. The graphs and charts may then be stored at step 256.

Figure 6:
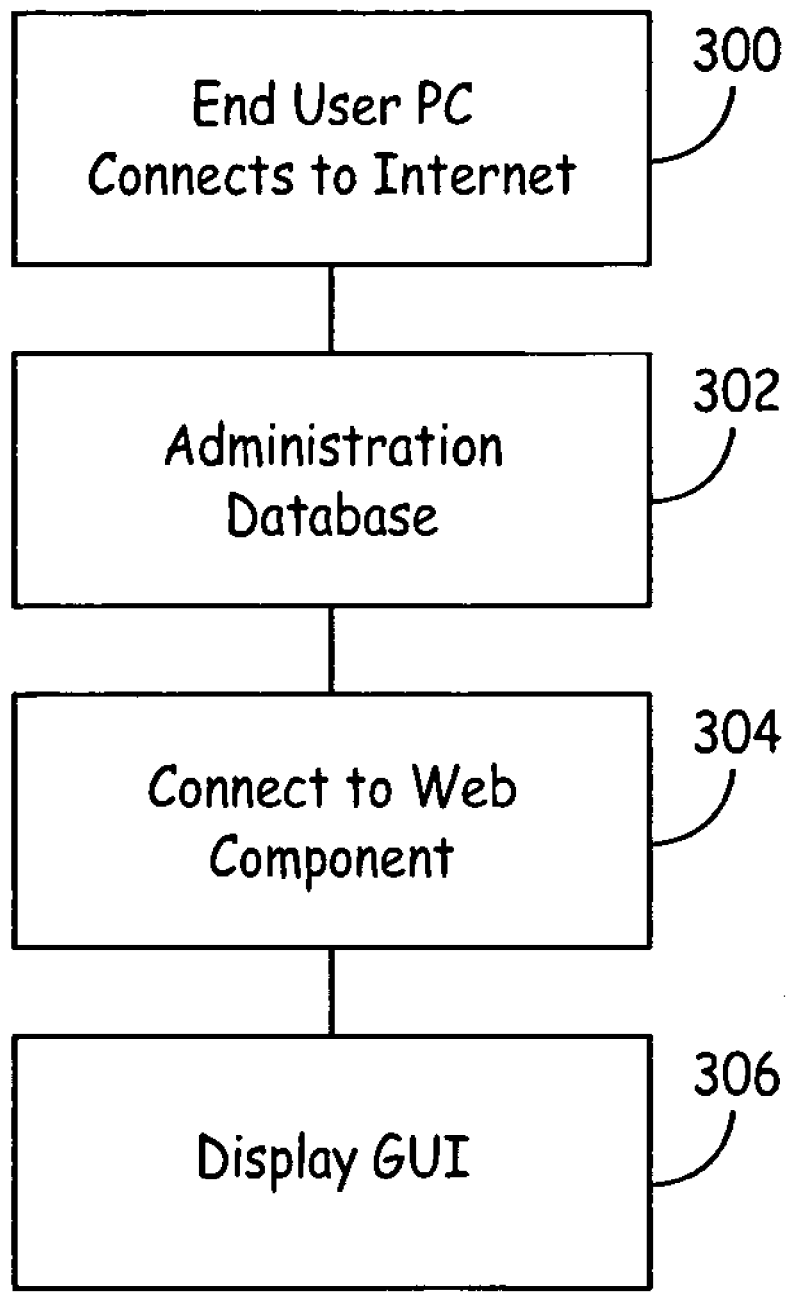
FIG. 6 is a flow chart illustrating an embodiment of a method of an end user station connecting to and interacting with the monitoring subsystem to view graphical representations of the test results.

Referring to FIG. 6, at step 300 an end user utilizes a personal computer or other similar digital display device to connect to the Internet. The end user then connects to the administrative database 220 at step 302 of FIG. 6. An analyst through the control program 112 is able to set access parameters of the administrative database 220, such as company codes, drill access, end user login, and/or passwords. The administrative database 220 may also store information or records relating to who has logged into the monitoring subsystem 110, a length of time spent in the monitoring subsystem 110, and/or information relating to what the end user viewed and/or accessed. In one embodiment, the administrative database 220 utilizes a secured socket layer certificate (SSL) technology to secure the information contained within the monitoring subsystem 110. Other forms of security and/or encryption methods may also be utilized to secure the information of the monitoring subsystem 110.

Figure 7:
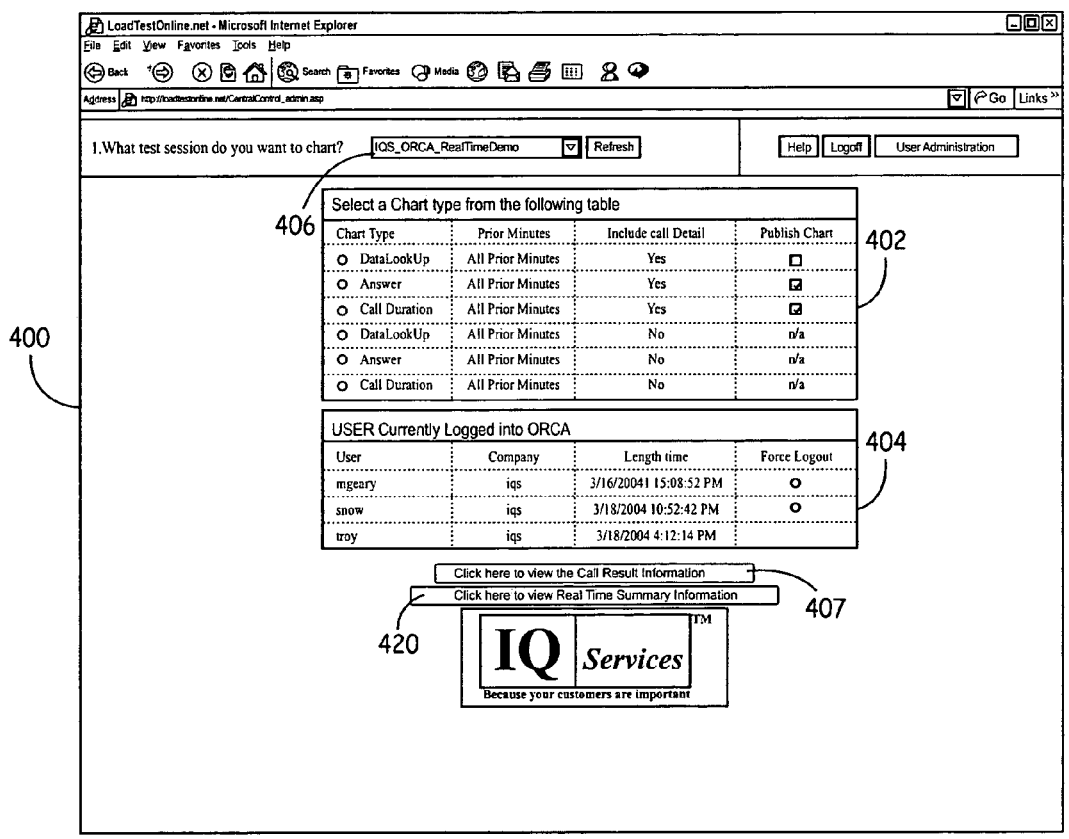
FIG. 7 depicts a graphical user interface (GUI) for an end user to log into the monitoring subsystem and select a particular test result to display.

After successfully logging into the administrative database 220 a user is directed at step 304 to the web-component 230 of the monitoring subsystem 110. Upon accessing the web-component 230 a graphic user interface (GUI) is displayed to the end user at step 306. Referring to FIG. 7, a chart selection GUI 400 is displayed to an end user with graphical icons representing various subjects, groupings and labels of information. In this particular embodiment, the chart selection GUI 400 may include a Chart Type Table 402 where an end user may select a particular chart type to view. The chart selection GUI 400 may also include a Display Table 404 that displays a list of end users currently logged into the monitoring subsystem 110. The Chart Selection GUI 400 may also include a drop-down and/or scrollable list 406 of selectable test that may be viewed and selected by an end user.

The Chart Selection GUI 400 preferably also includes a Call Results icon 407 that can be depressed by an end user to view the call results of a particular test. As illustrated in FIG. 8, the call results are displayed to the end user as a Call Results GUI 408. The Call Results GUI 408 may include graphical icons representing various subjects, groupings and labels of information. For example, the Call Results GUI 408 may include a Record Id 409 for each call, a Recording Indicator 410 if there is a voice recording associated with the particular call. The Call Results GUI 408 may also include Call Results 412 that can display if a call was busy, answered or not answered. Various timing parameters may also be displayed on the Call Results GUI 408, such as Dial Time 413, Answer Time 414, Call Termination 415, Call Duration 416, and/or Answer Response Time 417. The Call Results GUI 408 may also display other types of call result information depending upon the parameters of the telecommunication system 102 being tested.

The Chart Selection GUI 400 also preferably includes a Real Time Summary Icon 420 that can be depressed by an end user to view the real time test results of a particular test. As illustrated in FIG. 9, a Real Time GUI 422 is displayed that includes Real Time Summary Information 424. The Real Time Summary Information 424 can display a test start and stop time, duration of test, current calling lines, minutes at current calling line, current calls connected, total call initiated and total calls completed. The Real Time GUI 422 may also include Calls Per Hour GUI 430 which can display the numbers dialed, the number of times a particular number has been dialed, the peak number of calls to a particular number in an hour, number of calls to a particular number in a predetermined amount of time (such as within the last five minutes), and/or the number of calls since the last line marker.

The Real Time GUI 422 may also include Dialed Number Information GUI 440 which includes dialed numbers, number of completed calls to a particular number, number of connected calls to a particular number, shortest, longest and average duration of calls to a particular number. The Real Time GUI 422 may also include Test Case GUI 450 which includes a particular test or test case, number of completed calls for the test case, number of connected calls to the particular test case, shortest, longest and average duration of calls to the particular test case. The Real Time GUI 422 may also include a Call Result Information GUI 460 which includes dialed numbers, total calls, answered calls, unexpected greetings, busy signals, fast busy signals, network intercept, ring-no-answer, dead air, dropped calls, modem and/or pending evaluations. The Real Time GUI 422 may also include and display other types of information depending upon the parameters of the telecommunication system 102 being tested. In one embodiment, an end user may be able to select a particular display to obtain more detailed information.

Figure 10:
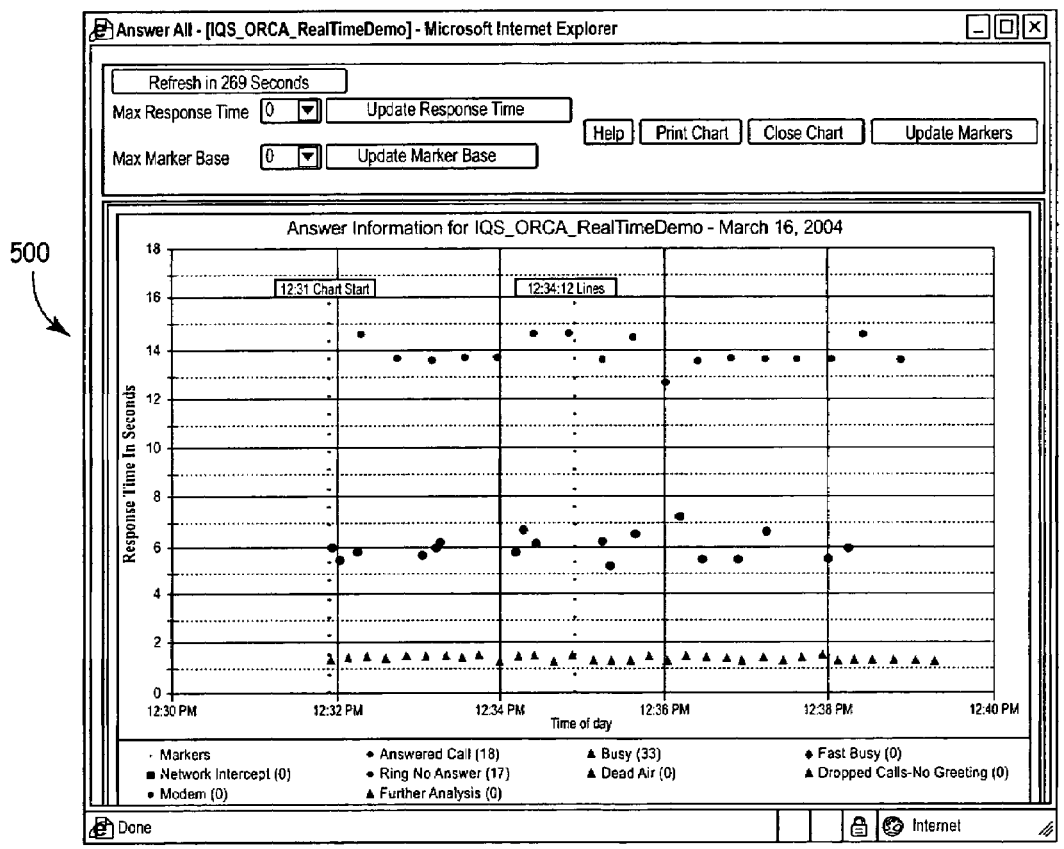
FIG. 10 depicts a GUI according to one embodiment of the invention which illustrates a plot of test results for call answering.

As illustrated in FIG. 10, an Answer Information Chart 500 may be displayed to an end user to monitor in real time the answering function of their telecommunication system 102. The Answer Information Chart 500 may include graphical icons representing various subjects, groupings and labels of information. For example, the type of answer information may be displayed as a particular geometric shape corresponding to, network intercept, modem, answered calls, ring-no-answer, further analysis, busy, dead air, fast busy and/or dropped call-no greeting. In one embodiment, the particular geometric shapes may be displayed along a timeline of the duration of the test. As illustrated in FIG. 10, the response time for each call may also be graphically displayed.

Figure 11:
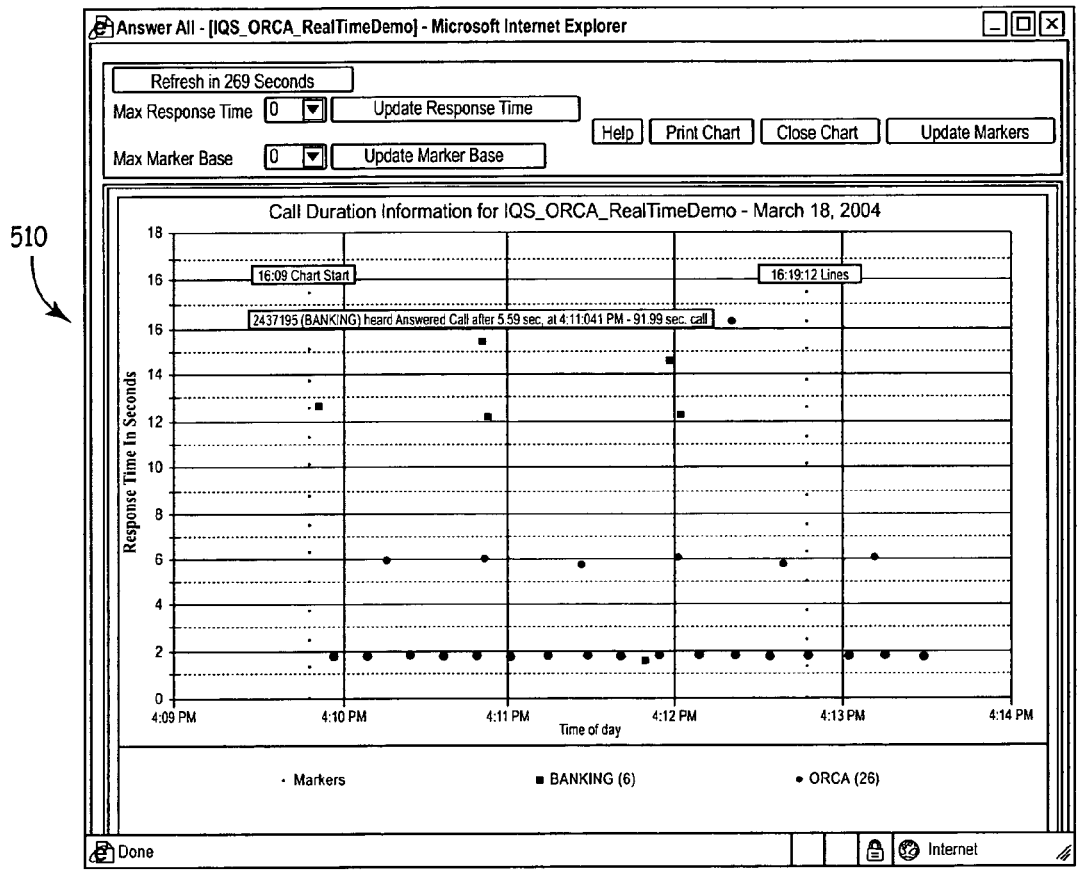
FIG. 11 depicts a GUI according to one embodiment of the invention which illustrates a plot of test results for call duration with mouse-over feature.

As illustrated in FIG. 11, a Call Duration Chart 510 may be displayed to an end user containing call duration information for each call sent during a test. Similar to the Answer Information Chart 500, the Call Duration Chart 510 can display each call as a particular geometric shape. Additionally, a user can position the cursor of the end user station over a particular geometric, termed mouse-over, to obtain a pop-up window of more detailed information about that particular call. The additional information may include record ID numbers, a time the call was placed, a time the call was answered and/or a numerical display of the duration of the call. Other information may also be displayed depending upon the parameters of the telecommunication system 102 being tested.

Figure 12:
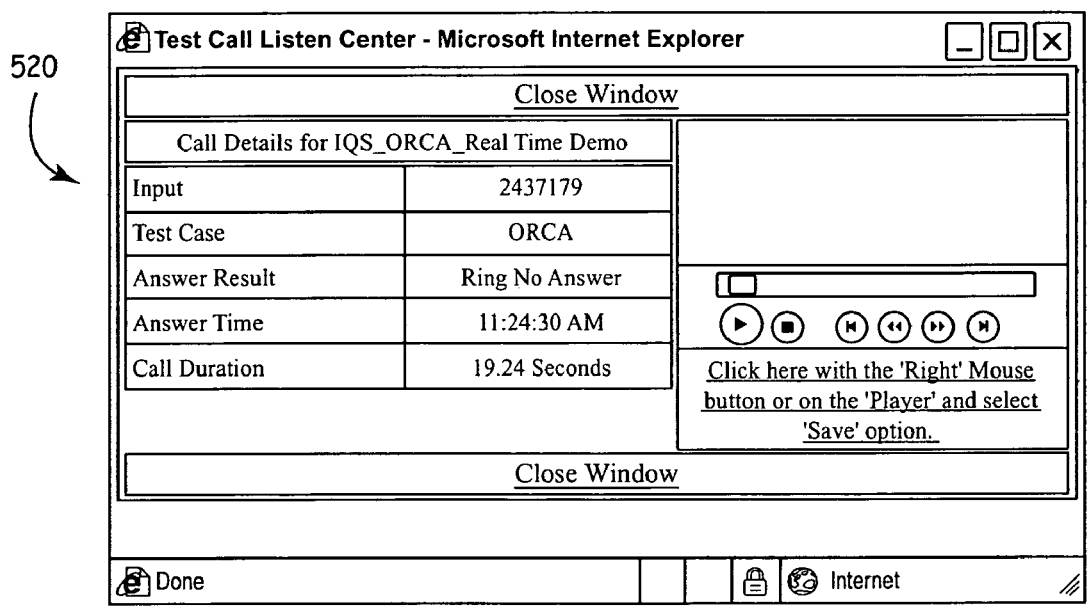
FIG. 12 depicts a GUI according to one embodiment of the invention which illustrates an interactive media for playing telephonic recordings to an end user.

In one embodiment, an end user may select or click on a particular test result, that includes an icon, table or similar indicator, to access a voice recording of a particular call. As illustrated in FIG. 12, a voice recording can be played back to the end user with a media player 520 integrated into the monitoring subsystem 110. The media player 520 may display call details such as the test case type, the answer result, and/or the call duration. Additional call information may also be displayed.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method for testing an automated call telecommunication system utilizing the Internet, the method comprising:
    providing a testing system;
    launching one or more test calls by the testing system into an automated call telecommunication system during normal operation of that system to test at least one aspect of the performance of the automated call telecommunication system in response to the one or more test calls;
    generating test results in response to the test of the at least one aspect of the performance of the automated call telecommunication system;
    converting the test results by a charting application into at least one displayable graphical representation, including generating mouse-over content;
    securing a communication over the Internet between an Internet-enabled end user station and the testing system; and
    causing the graphical representations of the test results to be displayed in real time on the Internet enabled end user station.

2. A method for testing an automated call telecommunication system utilizing the Internet, the method comprising:
    providing a testing system;
    launching one or more test calls by the testing system into an automated call telecommunication system during normal operation of that system to test at least one aspect of the performance of the automated call telecommunication system in response to the one or more test calls;
    generating test results in response to the test of the at least one aspect of the performance of the automated call telecommunication system;
    converting the test results by a charting application into at least one displayable graphical representation, including generating hyperlink content;
    securing a communication over the Internet between an Internet-enabled end user station and the testing system; and
    causing the graphical representations of the test results to be displayed in real time on the Internet enabled end user station.

3. The method of claim 2, wherein the hyperlink content includes a media player to facilitate playing back recorded calls.

4. A testing system to test an automated call telecommunication system, the testing system comprising:
    a testing subsystem configured to launch one or more tests calls into the automated call telecommunication system during normal operation of the automated call telecommunication system, wherein the testing subsystem measure at least one parameter of performance of the automated call telecommunication system in response to the one or more test calls;
    a monitoring subsystem in communication with the testing subsystem that enables remote monitoring and control of the testing subsystem, comprising
        an administrative server to facilitate secure communication between the monitoring subsystem and the Internet-enabled end user station;
        an Internet-component in communication with the administrative server to facilitate an interface between the Internet-enabled end user station and the testing subsystem; and
        a graphic application storable on the Internet-component to facilitate an interactive graphical representation of results from the tests;
    an Internet-enabled end user station in secure communication with the monitoring subsystem on the Internet; and
    a graphic user interface on the Internet-enabled end user station to facilitate interaction between the graphical representation and the end user.

5. The system of claim 4, wherein the graphical representation includes a mouse-over function that displays at least one test result when an end user utilizes a pointer of the Internet-enabled end user station to point at an icon on the Internet-component.

6. The system of claim 4, wherein the graphical representation includes a hyperlink function that links information.

7. The method of claim 6, wherein information includes a media player to facilitate playing back recorded calls.

8. The system of claim 4, wherein the graphical representation includes a chart selection graphic user interface, wherein an end user can select a particular chart of test results to view.

9. The system of claim 8, wherein the chart selection graphic user interface includes a chart type table, wherein an end user may select a particular chart type to view.

10. The system of claim 8, wherein the chart selection graphic user interface includes a display table that displays a list of end users currently logged into the monitoring subsystem.

11. The system of claim 8, wherein the chart selection graphic user interface includes a drop-down scrollable list of selectable tests that may be viewed and selected by an end user.

12. The system of claim 8, wherein the chart selection graphic user interface includes a call results icon depressible by an end user, wherein an end user is able to view call results of a particular test.

13. The system of claim 12, further including a call results graphic user interface, wherein an end user can view and select call result information to view more detailed information.

14. The system of claim 4, further including an answer information chart displayable on the Internet-enabled end user station to facilitate displaying answer information.

15. The system of claim 14, wherein the answer information is displayed as a particular geometric shape corresponding to a type of answer result.

16. The system of claim 4, further including a call duration chart to facilitate displaying duration information for each call transmitted during a test.

17. The system of claim 16, wherein the duration information is displayed as a geometric shape.

18. The system of claim 16, further including mouse-over content to facilitate displaying detailed call information.

* * * * *